United States Patent [19]

Deguin

[11] Patent Number: 4,708,794

[45] Date of Patent: Nov. 24, 1987

[54] INSTALLATION AND APPARATUS FOR TREATING A LIQUID, IN PARTICULAR FOR DEMINERALIZING WATER PASSING THROUGH A BED OF ACTIVE GRANULAR MATERIAL WHICH IS COMPACTED IN A HIGH POSITION AND WHICH IS PERIODICALLY REGENERATED BY A REVERSE FLOW

[75] Inventor: Alain Deguin, Paris, France

[73] Assignee: Societe Amenagement Urbain et Rural S.A., Paris, France

[21] Appl. No.: 729,271

[22] Filed: May 1, 1985

[30] Foreign Application Priority Data

May 3, 1984 [FR] France .............................. 84 106881

[51] Int. Cl.[4] .............................................. B01J 49/00
[52] U.S. Cl. .................................... 210/189; 210/275; 210/293
[58] Field of Search ............... 210/189, 275, 277, 278, 210/279, 293

[56] References Cited

U.S. PATENT DOCUMENTS 1,745,421  2/1930  Higgins ............................... 210/189
4,001,113  1/1977  Schoenrock et al. ............... 210/275

Primary Examiner—Ivars Cintins
Attorney, Agent, or Firm—Blakely, Sokoloff, Taylor & Zafman

[57] ABSTRACT

An installation and apparatus for treating a liquid, in particular for demineralizing water passing through a bed of active granular material which is compacted in a high position and which is periodically regenerated by a reverse flow. The installation comprises a treatment volume (10), an expansion volume (20) for the bed and disposed coaxially above the treatment volume (10); communication and isolation means (20, 32) between said two volumes, and means for periodically causing the liquid to be treated to flow through the bed and for causing regenerator liquids to flow through the bed.

14 Claims, 5 Drawing Figures

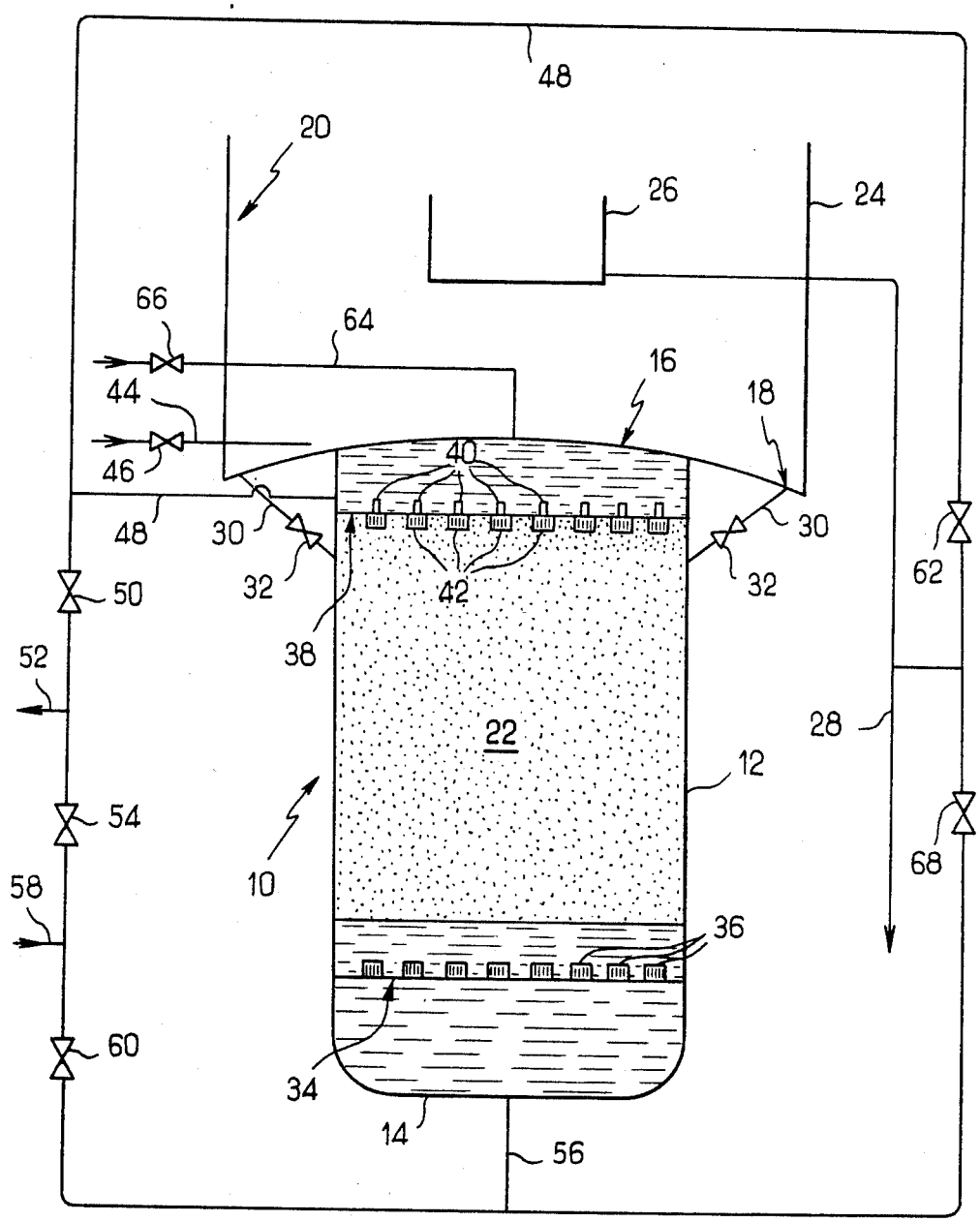
FIG_1

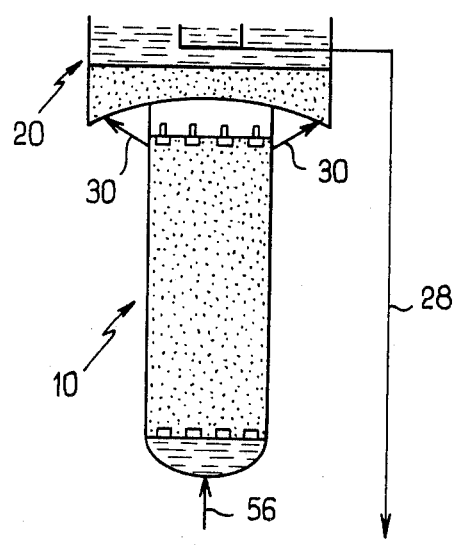
FIG_2a
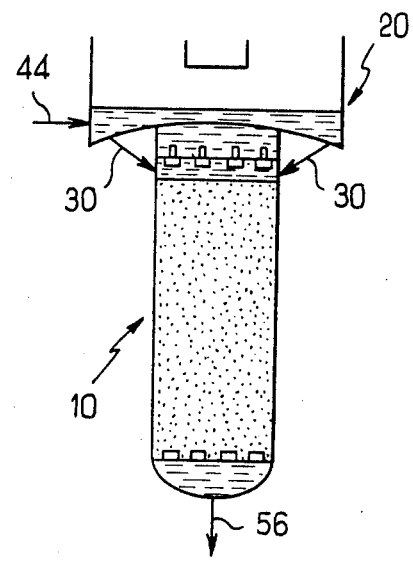
FIG_2b
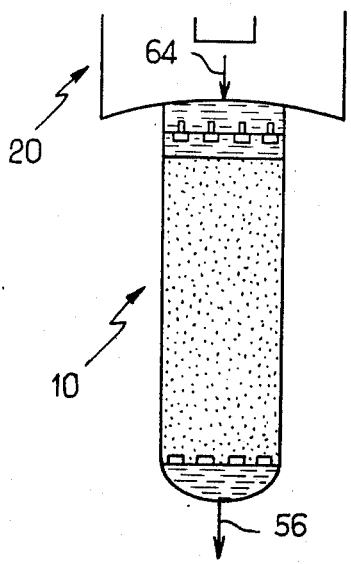
FIG_2c
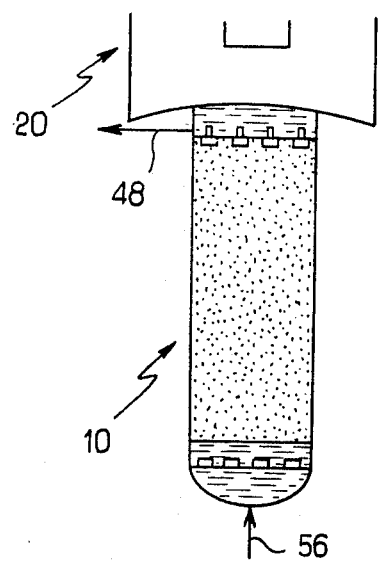
FIG_2d

INSTALLATION AND APPARATUS FOR TREATING A LIQUID, IN PARTICULAR FOR DEMINERALIZING WATER PASSING THROUGH A BED OF ACTIVE GRANULAR MATERIAL WHICH IS COMPACTED IN A HIGH POSITION AND WHICH IS PERIODICALLY REGENERATED BY A REVERSE FLOW

The present invention relates to an installation and to a method for treating liquids, and in particular for demineralizing the liquids. The treated liquids may be water, hydrocarbons and/or oils. The liquid is treated by exchanging ions as it passes through a bed of granular material maintained in a compacted state. The installation and the method of the present invention are concerned with enabling the bed of granular material which is normally maintained in the high position to be regenerated while in a low position.

The invention relates more particularly to treating water in order to remove nitrates and sulfate therefrom. In order to perform such treatment, the principle of ion exchange is used in which a rising flow of liquid to be treated passes through a bed of granular material which is advantageously constituted by one or more ion exchange resins. Clearly this type of granular material must periodically be regenerated in order to ensure proper activity while treating the water.

The present invention is concerned more particularly with regenerating the bed of granular material by a reverse flow, i.e. by making regenerator solutions flow downwardly through the bed in the opposite direction to the direction in which the liquid to be treated flows therethrough. In order to treat a liquid properly, the last layer of resin through which it passes must be completely regenerated. That is why it is essential for the bed of granular material to remain in the compacted state both when the reverse flow of generator liquid passes therethrough and when the forward flow of liquid to be compacted passes therethrough.

BACKGROUND OF THE INVENTION

In the prior art, reverse flow regeneration has required the resin bed to be held in position either by sending a flow of air or water against the flow of regenerating liquid, or else mechanically between two perforated plates.

In the mechanical case, it has been conventional to use a kind of inflatable balloon inside the apparatus containing the resin. Another known method consists in using polyethylene balls disposed between an upper perforated plate and the resin, in order to prevent the resin expanding. A third method consists in filling the space between the perforated plates with resin so that it occupies about 95% of the available space and, either in regenerating downwardly through the apparatus and passing the water to be treated flows upwardly therethrough at sufficient speed to press the resin bed against the upper plate, or else or regenerate upwardly at sufficient speed to press the resin bed against the upper plate and to pass the water to be treated downwardly during treatment.

In both variants of this method, all or part of the resin must be removed from the apparatus so as to periodically uncompact the resin in some outside device. The resin then subsequently needs to be returned to the apparatus.

Preferred implementations of the present invention avoid these drawbacks by allowing the resin to be removed and uncompacted in a single operation and by providing an expansion volume directly over the normal resin container.

SUMMARY OF THE INVENTION

The present invention provide an installation for treating and in particular for demineralizing liquid, such as water, hydrocarbons and oils, by passing the liquid through a bed of granular material capable of being regenerated by backflow of a regenerator liquid through the bed in the opposite direction to the flow of liquid during treatment, the bed being maintained in the compacted state throughout treatment, the installation comprising:

a treatment volume constituted by a first vertical cylindrical barrel closed at the bottom by a curved end plate and at the top by a curved end plate which is slightly upwardly convex;

an expansion volume for the bed constituted by a second vertical cylindrical barrel coaxially disposed above the said treatment volume, said second barrel having a downwardly concave curved bottom plate which is common with the top of the treatment volume and which is of greater diameter than the diameter of the first cylindrical barrel, the top of the said second barrel remaining open to the atmosphere and being equipped, preferably in the middle, with an overflow device;

means for putting the treatment and expansion volumes into communication with each other and for isolating them from each other, to periodically enable granular material to be transferred therebetween, thereby uncompacting the bed;

means for periodically circulating the liquid to be treated, a regenerator solution, and also a rinsing liquid, said means being disposed in such a manner as to ensure:

periodic uncompacting of the bed by passing a portion of the granular bed material into the expansion volume by means of a rising flow of liquid after the two volumes have been put into communication with each other;

returning all of the granular bed material into the treatment volume;

regenerating and slow rinsing the bed of granular material by a descending circulation of liquid through the bed, after said two volumes have been isolated from one another;

compacting the bed in a high position in the treatment volume by means of a rising current of liquid, rapid rinsing of the bed being performed in this high position; and treatment of the liquid to be treated by means of a rising flow of said liquid through the bed which is held in the compacted state in the high position.

BRIEF DESCRIPTION OF THE DRAWINGS

An implementation of the invention is described by way of example with reference to the accompanying drawings in which;

FIG. 1 is a diagrammatic section view through a liquid treatment installation in accordance with the invention; and FIGS. 2a to 2d show the main stages of the treatment method in accordance with the invention.

In the drawings, identical components are given the same reference numerals in all of the figures.

MORE DETAILED DESCRIPTION

A treatment installation in accordance with the invention comprises a treatment volume 10 which is constituted by a first vertical cylindrical barrel 12. The first vertical cylindrical barrel 12 is closed at its top and bottom ends by respective curved end plates 16 and 14. The installation also comprises an expansion volume 20 for the bed of granular material 22, which expansion volume is constituted by a second vertical cylindrical barrel 24 which is coaxially disposed above the treatment volume 10. As can be seen in the accompanying drawings, the second barrel 24 is completely open to atmospheric air at the top and is closed at the bottom by a concave bottom plate 16 which also constitutes the top plate closing the barrel 12. It can be seen that the second vertical cylindrical barrel 24 is of greater diameter than the first cylindrical barrel 12. The expansion volume 20 is fitted with an overflow 26 having a waste pipe 28 for removing uncompacting liquid.

As can be seen in the accompanying drawings, the second barrel 24 may be put into communication with the first barrel 12 by means of pipes 30 fitted with means 32 for isolating the two volumes 10 and 20 from each other. These isolating means 32 may advantageously be constituted, for example, by sliding valves. In practice, the isolating means may be constituted by a single pipe 30 or by a plurality of pipes evenly distributed around the periphery of the installation at a constant angle. The inside diameter of these pipes may lie in the range 25 to 100 mm, for example, with the exact diameter depending on the number of pipes 30 in the installation.

The installation further comprises a collection of ducts, valves and pumps for periodically circulating the liquid to be treated, or the regenerator solution, or liquids for rising and for uncompacting.

In the regeneration position, the bed of granular material or resin 22 stands on a floor 34 which is at a distance from the curved bottom 14 of the treatment volume 10, said floor 34 is additionally equipped with drainage means 36 occupying the lower portion of the first barrel 12. The upper portion of the treatment volume 10 is fitted with a second floor 38 which is at a distance from the slightly upwardly convex end plate 16 which is common to both cylindrical barrels 12 and 24. The floor 38 is likewise fitted with drainage means occupying the upper portion of the first barrel 12. Such drainage means are advantageously constituted by nozzles 42 and valves 40 enabling high flow-rates in the upwards direction and low flow-rates downwardly, respectively for the purposes of liquid treatment and of backflow regeneration. It is also important to observe that the isolating means 30, 32 between the treatment volume 10 and the expansion volume 20 run between one or more orifices situated through the first cylindrical barrel 12 below the upper floor 38 as equipped with the drainage means 40, 42, but slightly above the surface of the granular material 22 when the granular material is standing on the lower floor 24. The pipes 30 of the isolating means open out into the expansion volume 20 via one or more orifices situated in the lowest, i.e. peripheral, part 18 of the end plate 16 common to the volumes 10 and 20.

In practice, the common end plate 16 is only slightly curved in order to minimize the volume of water contained between the plate 16 itself and the upper floor 38.

The expansion volume 20 has an admission pipe 44 for additional uncompacting liquid, and said pipe includes a valve 46. The treatment volume 10 is fitted near the top with a pipe 48 for removing the treated liquid via a valve 50 and a pipe 52. At this point there is a bypass system suitable for mixing treated liquid with non-treated liquid, e.g. via a regulator member 54, such as a valve.

The quick rinse liquid and the liquid to be treated enter the bottom of the treatment volume 10 via a pipe 56 which is connected to the inlet pipe 58 for said liquids via a valve 60. The quick rise liquid is removed via the waste pipe 28 after passing round the pipe 48 and a valve 62.

The regenerator liquid(s) enter(s) the treatment volume 10 via a pipe 64 fitted with an isolating valve 66.

The regenerator liquid(s) is/are removed via the pipes 56 and 28 after passing through a valve 68.

This installation enables the above-defined treatment method to be implemented, and operates as follows.

At the end of a treatment cycle, as illustrated in FIG. 1 and prior to a regeneration operation, a high flow-rate of liquid is delivered by the valve 60 and passes via the pipes 58 and 56, thereby lifting the bed of granular material 22. This operation uncompacts the bed which occupies about 95% of the volume between the floors 34 and 38 in the cylindrical barrel 12 while it is at rest. By opening the valve(s) 32 the resin is allowed to pass into the expansion volume 20 located above the treatment volume 10. The uncompacted volume of the resin corresponds to approximately one and a half times its compacted volume as used during treatment. The height of the second barrel 24 which constitutes the expansion volume 20 must therefore be determined in such a manner as to avoid any risk of the granular material overflowing.

During this operation, the liquid used for uncompacting the resin, which liquid is advantageously constituted by water, is evacuated via the overflow device 26 and then via the waste pipe 28.

The resin is kept expanded to a constant level in the volume 20 by means of a pre-adjusted flow-rate of the uncompacting liquid. This step is illustrated in FIG. 2a.

Once the resin has been uncompacted, the admission of water via the valve 60 is stopped and the resin returns substantially to the position shown in FIG. 2b under the sole effect of its own weight. In order to encourage all of the resin to return to the treatment volume 10, the expansion volume 20 is advantageously equipped with a pressurized water inlet 44 having a valve 46 which is opened at this time. This pressurized water admission device is shown schematically in FIG. 1, and is advantageously constituted by a circular flushing ramp.

At the same time as the valve 60 is closed, the valve 68 is opened in order to remove the liquid admitted by the valve 46.

The return of the resin into the treatment volume 10 is thus facilitated by the opening of the valve 68 and the suction of the liquid inserted via the pipe 44 towards the outlet via the pipes 56 and 28, thus setting up downwards motion.

When all of the resin 22 has returned to the treatment volume 10, the valve 46 is closed to turn off the water, and the isolating valve(s) 32 between the volumes 10 and 20 are also closed. The valve 66 is opened to allow the regenerator liquid(s) to pass into the treatment volume 10 via the pipe 64 and to leave the treatment volume via the pipes 56 and 28 after passing through the valve 68 which is left open (see FIG. 2c).

The passage of the regenerator liquid(s) is followed by slow water rinsing using the same set of valves 66 and 68 and with the same low speed of passage through the resin bed 22.

At the end of the slow rinsing operation, the valves 66 and 68 are closed and the valves 60 and 62 are opened to allow a rising flow of rapid rinsing liquid at a rate such that the bed of granular material 22 is comparted from the top down of the treatment volume 10, as shown in FIG. 2d.

This operation consists in rinsing the last traces of the regenerator agents from the resin and in maintaining the compact state in the high position in order to retain the advantage of backflow regeneration, i.e. without disturbing the layers of resin as previously regenerated in the downwards direction.

At the end of the rapid rinsing operation, treatment can begin again via the same admission circuit as was used for the rapid rinsing, but by adjusting the flow-rate to its operational value which is not less than the flow-rate for rapid rinsing in order to ensure that the bed of granular material 22 is permanently maintained in the compacted state and in the high position within the treatment volume 10.

Further, the circuit for removing treated liquid comprises pipes 48 and 52, with the valve 50 remaining open and the valve 62 being closed.

It is possible to mix treated liquid with non-treated liquid by adjusting the valve 54 so that only a fraction of the flow-rate passing through the treatment volume needs to be treated, whenever possible.

The installation and the method according to the present invention thus serve to eliminate nitrates and sulfates by exchanging them for other types of anions previously fixed to the resin. To this end, the treatment volume 10 may contain, for example, a highly anionic resin suitable for fixing anions. The resin may be constituted, for example, by a copolymer matrix including positively charged active sites such as quaternized amino active sites.

To perform the method in accordance with the invention, a solution of sodium chloride may advantageously be used as the regenerator liquid with or without a fraction of the recovered regenerator liquid being recycled after each cycle. In particular, the last fraction of the regeneration and the slow rinsing stage liquids may be recovered and recycled because of their low nitrate and sulfate content combined with their sufficiently high chloride content for regenerating exchange.

When the water to be treated has a high chloride content, sodium chloride regeneration is advantageously finished off by a subsequent passage using a sodium bicarbonate solution in sufficient quantities to exchange the chloride ions which take up sites in the resin for bicarbonate ions.

The resin used has similar affinity for chloride ions and for bicarbonate ions, so that direct regeneration by sodium bicarbonate does not displace strong acid ions such as nitrates and sulfates which have a better affinity for the resin.

The advantage of regenerating in two stages using sodium chloride initially and then small quantities of sodium bicarbonate is thus to facilitate the following exchange:

$$RCl + HCO_3^- \rightleftharpoons RHCO_3 + Cl^-$$

Thus, during the water treatment phase, nitrate and sulfate ions are exchanged with $HCO_3^-$ ions, and then with $Cl^-$ ions. The treated water starts by taking on $HCO_3^-$ ions thereby reducing its aggressive effects on limestone, if any, and at the same time its chloride content remains stable rather than increasing to a value which could exceed the maxima laid down by the current standards for drinking water. Thus the method and the installation in accordance with the present invention may advantageously be applied to any type of water regardless of whether it already has a high chloride ion content.

The bicarbonate ion content is not limited by current drinking water standards, and unlike chloride ions it reduces the danger of corrosion in the network of water distribution pipes.

In some liquids, and in particular water, when there are simultaneous high levels of nitrates, sulfates, calcium and magnesium, the calcium and magnesium ion content is measured in terms of "hardness".

The present invention can be used to simultaneously soften the water being treated by using in addition a strongly acidic cation exchanging resin.

The method of the present invention can thus be somewhat modified to provide a single treatment for eliminating nitrates, sulfates and for reducing water hardness without affecting the process of regenerating the treatment bed. To do this a uniform mixture of an anionic resin as defined above and a cationic resin should be used to simultaneously soften and denitrate and desulfate the water. In this case, the regeneration operation is performed by using the sequences described above and by using the same regenerator agent(s).

The advantage of the method modified in this manner is to enable a single apparatus to be used to perform two treatments which are usually separate. This is achieved without altering the regeneration method of the present invention in any way.

Naturally, the present invention is not limited to the particular implementations described above, and many variants are possible within the scope of the claims.

I claim:

1. A installation for treating and in particular for demineralizing liquid by passing the liquid through a bed of granular material capable of being regenerated by backflow of a regenerator liquid through the bed in the opposite direction to the flow of liquid during treatment, the bed being maintained in the compacted state throughout treatment, the installation comprising:
   a treatment volume constituted by a first vertical cylindrical barrel closed at the bottom by a curved end plate and at the top by a curved end plate which is upwardly convex;
   granular material disposed in said treatment volume in use;
   an expansion volume for the bed constituted by a second vertical cylindrical barrel coaxially disposed above said treatment volume, said second barrel having a downwardly concave curved bottom plate which is common with the top of the treatment volume and which is of greater diameter than the diameter of the first cylindrical barrel, the top of the said second barrel remaining open to the atmosphere and being equipped with an overflow device;
   means for putting the treatment and expansion volumes into communication with each other and for isolating them from each other, to periodically enable the granular material to be transferred therebetween, thereby uncompacting the bed;

means for periodically circulating the liquid to be treated, a regenerator solution, and also a rinsing liquid, said periodic circulating means comprising:

means for periodically uncompacting the bed by passing a portion of the granular bed material into the expansion volume by means of a rising flow of liquid after the two volumes have been put into communication with each other and thereafter returning all of the granular bed material into the treatment volume;

means for compacting the bed in a high position in the treatment volume by means of a rising current of liquid, whereby rapid rinsing of the bed is performed in this high position; and means for treating the liquid to be treated by means of a rising flow of said liquid through the bed which is held in the compacted state in the high position.

2. An installation according to claim 1, further comprising a means for supplying water under pressure coupled to said expansion volume to facilitate returning the granular material into the treatment volume.

3. An installation according to claim 1, wherein the bed of granular material rests on a floor which is at a distance from the curved bottom end plate of the treatment volume and which is fitted with drainage means disposed in the bottom portion of the first barrel.

4. An installation according to claim 1, wherein the isolating means disposed between the two volumes comprises sliding valves of sufficiently large diameter to enable the granular material to pass therethrough without clogging.

5. An installation according to claim 1, wherein the upper portion of the treatment volume is equipped with an upper floor plate at a distance from the curved end plate common to the treatment volume and the expansion volume, said upper floor plate being fitted with drainage means constituted by nozzles and respective valves enabling a high flow-rate of liquid in the upward direction and a low flow-rate of liquid in the downward direction thereby enabling both the treatment and the backflow regeneration.

6. An installation according to claim 5, wherein the isolating means between the treatment volume and the expansion volume are disposed in fluid communication with at least one orifice disposed through the first cylindrical barrel at a point below the upper floor plate and its drainage means, and above the level of the granular material in the treatment volume when said granular material rests on the lower floor plate, said isolation means also communicating with the expansion volume via at least one orifice situated at a low point of the curved end plate common to said two volumes.

7. An installation according to claim 1, wherein the treatment volume includes a top pipe fitted with a valve which opens out therein above the level of the high floor plate in the curved end plate, said upper pipe serving to admit the regenerator liquid and the slow rinsing liquid.

8. An installation according to claim 1, wherein the treatment volume includes a high level pipe opening out therein above the level of the upper floor plate through the cylindrical barrel wall and serving to remove treated liquid via a first valve and associated pipe in a first mode and to remove the rapid rinsing liquid via a second valve and associated pipe in a second mode.

9. An installation according to claim 1, wherein the treatment volume includes a bottom pipe opening out therein via the curved bottom plate below the lower floor, said bottom pipe serving to admit the liquid for uncompacting the bed, the liquid to be treated, and the rapid rinsing liquid and also to remove the regenerator liquid and the slow rinsing liquid.

10. An installation according to claim 1, wherein the overflow device for the liquid used when uncompacting the bed is in the form of a central overflow device fitted with a waste pipe.

11. An installation according to claim 1, wherein the said granular material is constituted by at least one ionexchange resin.

12. An installation according to claim 11, wherein the resin is a strongly anionic resin.

13. An installation according to claim 11, wherein the resin is constituted by a uniform mixture of strongly anionic resin and strongly cationic resin.

14. An installation according to claim 1, wherein the second barrel constituting the expansion volume is of sufficient size so as to prevent any of the granular bed material from overflowing.

* * * * *

UNITED STATES PATENT AND TRADEMARK OFFICE
CERTIFICATE OF CORRECTION

PATENT NO. : 4,708,794
DATED : 11/24/87
INVENTOR(S) : Deguin

It is certified that error appears in the above-identified patent and that said Letters Patent is hereby corrected as shown below: On the Title Page:

[30] Foreign Application Priority Data delete "France..... 84 106881" insert--France..... 84 06881--

Signed and Sealed this

Twenty-second Day of November, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,708,794

DATED : Nov. 24, 1987

INVENTOR(S) : Deguin

It is certified that error appears in the above-identified patent and that said Letters Patent is hereby corrected as shown below:

On the title page, item [73] Assignee: delete "Societe Amenagement Urbain et Rural S.A." insert --Societe d'amenagement Urbain et Rural S.A.(S.A.U.R.)--.

Signed and Sealed this

Ninth Day of January, 1990

Attest:

JEFFREY M. SAMUELS

*Attesting Officer*     *Acting Commissioner of Patents and Trademarks*